(12) United States Patent
Moon et al.

(10) Patent No.: US 8,705,203 B2
(45) Date of Patent: Apr. 22, 2014

(54) SPINDLE MOTOR AND DISK DRIVING DEVICE

(71) Applicant: Samsung Electro-Mechanics Co., Ltd., Suwon (KR)

(72) Inventors: Hyung Ki Moon, Suwon (KR); Hong Joo Lee, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/658,984

(22) Filed: Oct. 24, 2012

(65) Prior Publication Data

US 2014/0053170 A1 Feb. 20, 2014

(30) Foreign Application Priority Data

Aug. 17, 2012 (KR) .................. 10-2012-0090321

(51) Int. Cl.
*G11B 17/02* (2006.01)

(52) U.S. Cl.
USPC ..................................... 360/99.08

(58) Field of Classification Search
USPC ........... 360/99.08, 99.16, 97.12, 97.19, 97.22
See application file for complete search history.

(56) References Cited

U.S. PATENT DOCUMENTS

| 5,432,644 A * | 7/1995 | Tajima et al. .............. 360/99.04 |
|---|---|---|
| 5,668,427 A | 9/1997 | Morita |
| 6,698,931 B2 * | 3/2004 | Hino .............................. 384/107 |
| 7,518,823 B2 * | 4/2009 | Albrecht et al. ............ 360/99.08 |
| 8,008,819 B2 * | 8/2011 | Mizukami ....................... 310/90 |
| 8,284,515 B2 * | 10/2012 | Sekii et al. ................ 360/99.08 |
| 2002/0135260 A1 | 9/2002 | Petersen |
| 2005/0086678 A1 | 4/2005 | Miyamori et al. |
| 2006/0279876 A1 * | 12/2006 | Albrecht et al. ........... 360/99.08 |
| 2008/0029212 A1 * | 2/2008 | Tamaoka ................... 156/275.5 |
| 2008/0218019 A1 * | 9/2008 | Sumi ............................... 310/90 |
| 2010/0231074 A1 * | 9/2010 | Yamashita et al. .............. 310/90 |
| 2011/0025151 A1 | 2/2011 | Lim et al. |
| 2011/0123139 A1 * | 5/2011 | Kimura et al. ................ 384/107 |

(Continued)

FOREIGN PATENT DOCUMENTS

JP 9-46938 2/1997
JP 2004-166439 6/2004

(Continued)

OTHER PUBLICATIONS

Office Action issued by the Japanese Patent Office on Nov. 19, 2013 in the corresponding Japanese patent application No. 2012-235983.

*Primary Examiner* — Allen T Cao

(57) ABSTRACT

There is provided a spindle motor for a 2.5" type disk driving device, including: a base having a stator core seating part protruding upwardly in an axial direction; a stator core including a ring-shaped coreback part, a tooth part, and a front end part; and a coil wound around the stator core, wherein when a length of the stator core from an inner end portion of the coreback part to the endmost part of the front end part is defined as L and a height of the wound coil from the lowermost edge of the coil in an axial direction to the uppermost edge thereof is defined as H, a ratio (H/L) of the height of the wound coil to the length of the stator core in which back electromotive force (B-EMF) is 0.35 V/Krpm or more when the supply of power is stopped satisfies $0.524 \leq H/L \leq 0.703$.

10 Claims, 5 Drawing Sheets

(56) References Cited

U.S. PATENT DOCUMENTS

| | | | |
|---|---|---|---|
| 2011/0299193 A1* | 12/2011 | Sekii et al. | 360/99.08 |
| 2012/0033329 A1* | 2/2012 | Mizukami et al. | 360/99.08 |
| 2012/0050911 A1 | 3/2012 | Tamaoka et al. | |
| 2012/0237148 A1* | 9/2012 | Niwa et al. | 384/114 |
| 2012/0250183 A1* | 10/2012 | Tamaoka et al. | 360/99.08 |
| 2013/0101450 A1* | 4/2013 | Kimura et al. | 417/423.7 |
| 2013/0194701 A1* | 8/2013 | Fukushima | 360/99.08 |

FOREIGN PATENT DOCUMENTS

| | | |
|---|---|---|
| JP | 2005-151798 | 6/2005 |
| JP | 2006-230095 | 8/2006 |
| JP | 2011-30417 | 2/2011 |
| JP | 2012-55075 | 3/2012 |

* cited by examiner

SPINDLE MOTOR AND DISK DRIVING DEVICE

CROSS-REFERENCE TO RELATED APPLICATIONS

This application claims the priority of Korean Patent Application No. 10-2012-0090321 filed on Aug. 17, 2012, in the Korean Intellectual Property Office, the disclosure of which is incorporated herein by reference.

BACKGROUND OF THE INVENTION

1. Field of the Invention

The present invention relates to a spindle motor and a disk driving device.

2. Description of the Related Art

In accordance with the trend for the miniaturization of electronic devices such as laptop computers, external hard drives, video game consoles, or the like, a small-sized spindle motor used in a disk driving device has been thinned.

A thinned disk driving device requires a motor structure in which low voltage driving characteristics are improved. Therefore, research into a motor structure in which low voltage characteristics are improved has been actively undertaken.

A hard disk driving device includes a recording head as a component for reading information recorded on a magnetic disk and writing information thereon. The recording head is mounted on a base member of the spindle motor and moves across the face of the magnetic disk.

The recording head is driven by a voice coil motor (VCM). When the supply of power thereto is stopped, in the case in which sufficient power is not secured in the voice coil motor, the recording head remains positioned above the magnetic disk in place, such that in the case that the recording head and the magnetic disk contact each other, information recorded in the magnetic disk may be seriously damaged.

In order to solve this defect, the hard disk driving device may drive the voice coil motor using back electromotive force (B-EMF) of the spindle motor. The voice coil motor is driven, such that the recording head returns to an initial position without contacting the magnetic disk, known as emergency parking.

Here, a method of using B-EMF is as follows. Electrical energy is generated through inertial force of the magnetic disk, rotating after the supply of power is stopped during the driving of the spindle motor, and is used in the voice coil motor.

In the disk driving device according to the related art, B-EMF is not problematic. However, in a 2.5" type disk driving device that has been miniaturized, a B-EMF securing problem has been generated. Therefore, research into a technology for securing B-EMF has been demanded.

In the following Related Art Documents, Patent Document 1 has disclosed a technology of adjusting a torque constant by adjusting a height of a stator core and a height of a rotor magnet in a 2.5" type disk driving device having a thickness 7 mm, Patent Document 2 has disclosed a fluid interposed between a fixed member and a rotating member so as to be rotatable at a low driving current, and Patent Document 3 has disclosed a method of adjusting a torque constant using a stator core formed by molding a ferromagnetic particulate material.

These Related Art documents do not specifically disclose methods capable of reducing noise and vibrations, and securing back electromotive force enabling emergency parking while securing thrust dynamic pressure in a miniaturized disk driving device.

RELATED ART DOCUMENT (Patent Document 1) Japanese Patent Laid-open Publication No. 2012-055075
(Patent Document 2) Japanese Patent Laid-open Publication No. 2011-030417
(Patent Document 3) US Patent Laid-open Publication No. 2002-0135260

SUMMARY OF THE INVENTION

An aspect of the present invention provides a spindle motor and a disk driving device capable of securing a sufficient amount of back electromotive force (B-EMF) and performing emergency parking by adjusting a radial length of a stator core and an axial height of a coil wound around the stator core.

According to an embodiment of the present invention, there is provided a spindle motor for a 2.5" type disk driving device, including: a base having a stator core seating part protruding upwardly in an axial direction; a stator core including a ring-shaped coreback part disposed on the stator core seating part, a tooth part extended from the coreback part in an outer diameter direction, and a front end part formed at an end portion of the tooth part; and a coil wound around the stator core, wherein when a length of the stator core from an inner end portion of the coreback part to the endmost part of the front end part is defined as L and a height of the wound coil from the lowermost edge of the coil in an axial direction to the uppermost edge thereof is defined as H, a ratio (H/L) of the height of the wound coil to the length of the stator core in which B-EMF is 0.35 V/Krpm or more when the supply of power is stopped satisfies $0.524 \leq H/L \leq 0.703$.

The disk driving device may have a height of 5 mm or less.
L may have a range of 3.70 to 4.20 mm, and H may have a range of 2.20 to 2.60 mm.

The spindle motor may further include: a sleeve provided inwardly of the stator core seating part in a radial direction; and a shaft rotatably disposed in the sleeve.

The spindle motor may further include: a rotor case fixed to the shaft and having a magnet disposed on an inner peripheral surface thereof, the magnet facing the stator core in the radial direction, wherein the rotor case includes a main wall part protruding downwardly in an axial direction so that the oil is sealed between an outer peripheral surface of the sleeve and an inner peripheral surface of the main wall part, the main wall part facing an inner peripheral surface of the stator core seating part in the radial direction.

The spindle motor may further include: a sleeve housing provided inwardly of the stator core seating part in the radial direction; a shaft fixedly coupled to an inner end surface of the sleeve housing in the radial direction; and a rotating sleeve rotatably disposed outwardly of the shaft in the radial direction and inwardly of the sleeve housing in the radial direction.

The spindle motor may further include: a rotor case extended from the rotating sleeve in an outer diameter direction and having a magnet disposed on an inner peripheral surface thereof, the magnet facing the stator core in the radial direction; and a fixed cap fixed to an upper portion of the shaft and facing an inner end portion of the rotor case in the radial direction so as to form a gap between the fixed cap and the inner end portion of the rotor case, wherein an outer edge of the fixed cap in the radial direction and an inner end portion of a rotor hub in the radial direction include a first oil sealing part formed therebetween so as to seal oil, and either of the outer peripheral surface of the rotating sleeve and an inner peripheral surface of the sleeve housing is inclined, such that a second oil sealing part taper-sealing the oil is formed.

According to another aspect of the present invention, there is provided a spindle motor for a 2.5" type 5 mm thick disk driving device, including: a stator core; and a coil wound around the stator core, wherein when a distance obtained by subtracting an inner diameter of the stator core contacting a base from an outer diameter of the stator core, from the center of the stator core to a point of the endmost part of the stator core, is defined as L and a height of the wound coil from the lowermost edge of the coil in an axial direction to the uppermost edge thereof is defined as H, H/L satisfies $0.524 \leq H/L \leq 0.703$.

According to another aspect of the present invention, there is provided a disk driving device including: the spindle motor as described above; a head transfer part transferring a recording head reading information stored on a disk mounted in the spindle motor and writing data to the disk; and a housing receiving the spindle motor and the head transfer part therein.

The number of disks may be 2 or less.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
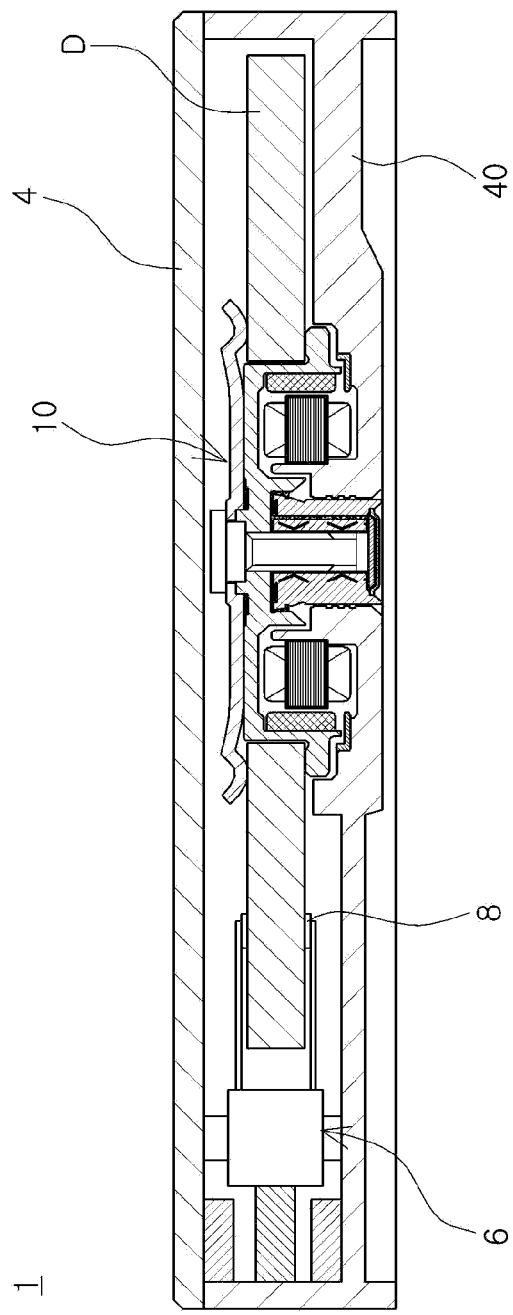
FIG. 1 is a schematic cross-sectional view showing a disk driving device according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, like reference numerals will be used to designate like components having similar functions throughout the drawings within the scope of the present invention.

Disk Driving Device

FIG. 1 is a schematic cross-sectional view showing a disk driving device according to an embodiment of the present invention.

Referring to FIG. 1, the disk driving device 1 may be a hard disk driving device and include a spindle motor 10, a head transfer part 6, and a housing 4.

The spindle motor 10 may have all of the characteristics of a spindle motor according to the embodiment of the present invention to be described below and have a magnetic disk D mounted thereon.

The case in which the number of magnetic disks D is one is shown in FIG. 1. In the case of the present invention, the number of magnetic disks D is not limited. However, since a height of the disk driving device 1 is 5 mm or less and the used magnetic disk D is miniaturized to a 2.5" type disk driving device, the number of magnetic disks D may be two or less.

The head transfer part 6 may transfer a recording head 8 reading information stored on the magnetic disk D mounted in the spindle motor 10, to the magnetic disk D.

The head transfer part 6 stands by in an initial position outside of the magnetic disk D in the case in which power is not applied thereto. When power is applied thereto, the head transfer part 6 may transfer the recording head 8 to the magnetic disk D to allow the recording head 8 to read information from the magnetic disk D and write information to the magnetic disk D.

The housing 4 may be fixed to the base 40 forming a lower appearance of the disk driving device 1 and receive the spindle motor 10 and the head transfer part 6 therein.

When the recording head 8 is positioned on the magnetic disk D, in the case in which the supply of the power is stopped, the head transfer part 6 returns to the initial position without contacting the magnetic disk D, known as emergency parking.

In order to enable emergency parking, back electromotive force (B-EFM) needs to be sufficiently secured in the spindle motor. The spindle motor 10 of a scheme of securing the B-EMF will be described below.

Spindle Motor

Figure 2:
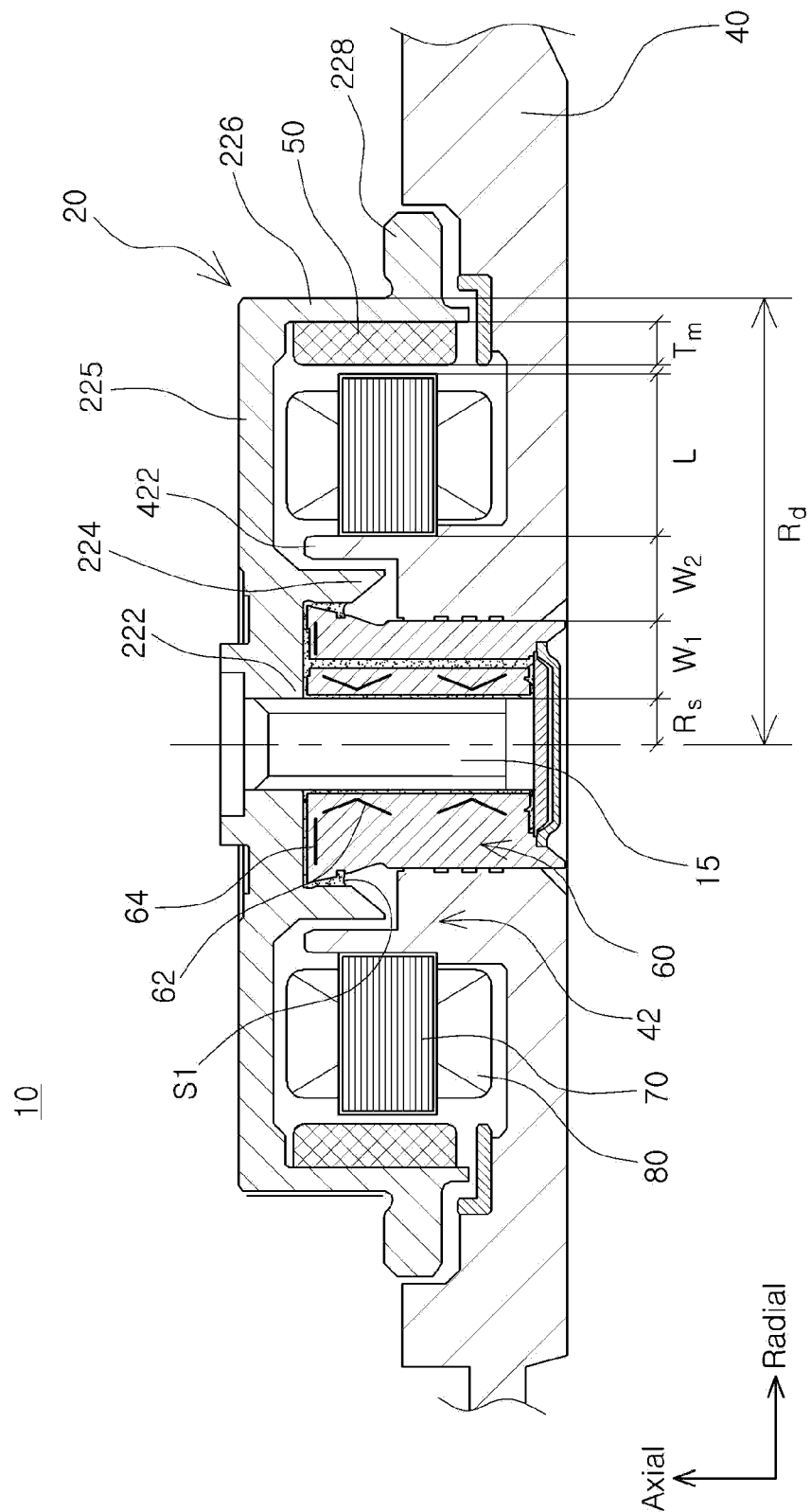
FIG. 2 is a schematic cross-sectional view showing a spindle motor according to the embodiment of the present invention.

FIG. 2 is a schematic cross-sectional view showing a spindle motor according to the embodiment of the present invention.

Referring to FIG. 2, the spindle motor 10 according to the embodiment of the present invention may include a base 40, a stator core 70, and a coil 80.

In addition, the spindle motor 10 may further include a sleeve 60 and a shaft 15.

Terms with respect to directions will be first defined. As viewed in FIG. 2, an axial direction refers to a vertical direction in which the shaft 15 is inserted, and a radial direction refers to a direction towards an outer edge of a rotor case 20 based on the shaft 15 or a direction towards the center of the shaft 15 based on the outer edge of the rotor case 20.

The spindle motor 10 according to the embodiment of the present invention shown in FIG. 2 may have a rotating shaft structure in which the rotatable shaft 15 is inserted into the sleeve 60.

The base 40 may include a stator core seating part 42 in which a part 422 protruding upwardly in an axial direction is formed. The sleeve 60 may be provided inwardly of the stator core seating part 42 in the radial direction. The protruding part 422 may support the stator core 70 in the axial direction.

The shaft 15 may be inserted into the sleeve 60 and a clearance between the shaft 15 and the shaft 60 may be filled with oil. An upper portion of an outer surface of the sleeve 60 in the radial direction may be provided with an inclined surface so that a diameter of the sleeve 60 increases in an outer diameter direction.

The rotor case 20 may include a rotor hub 222 press-fitted into and fixed to an upper end of the shaft 15, a cover part 225 extended from the rotor hub 222 in the outer diameter direction to cover the stator core 70, and a magnet support part 226 bent downwardly from the cover part 225 in an axial direction to support the magnet 50.

In addition, the magnet support part 226 may provided with a disk support part 228 bent outwardly in the outer diameter direction to support the disk.

The rotor case 20 may include a main wall part 224 protruding downwardly in the axial direction so that the oil is sealed between the main wall part 224 and an outer peripheral surface of the sleeve 60 in the radial direction.

The main wall part 224 may face an inner surface of the stator core seating part 42 in the radial direction.

The oil is sealed between an inner surface of the main wall part 224 and the outer surface of the sleeve 60 on which the inclined surface is formed, such that an oil sealing part S1 may be formed.

Figure 3:
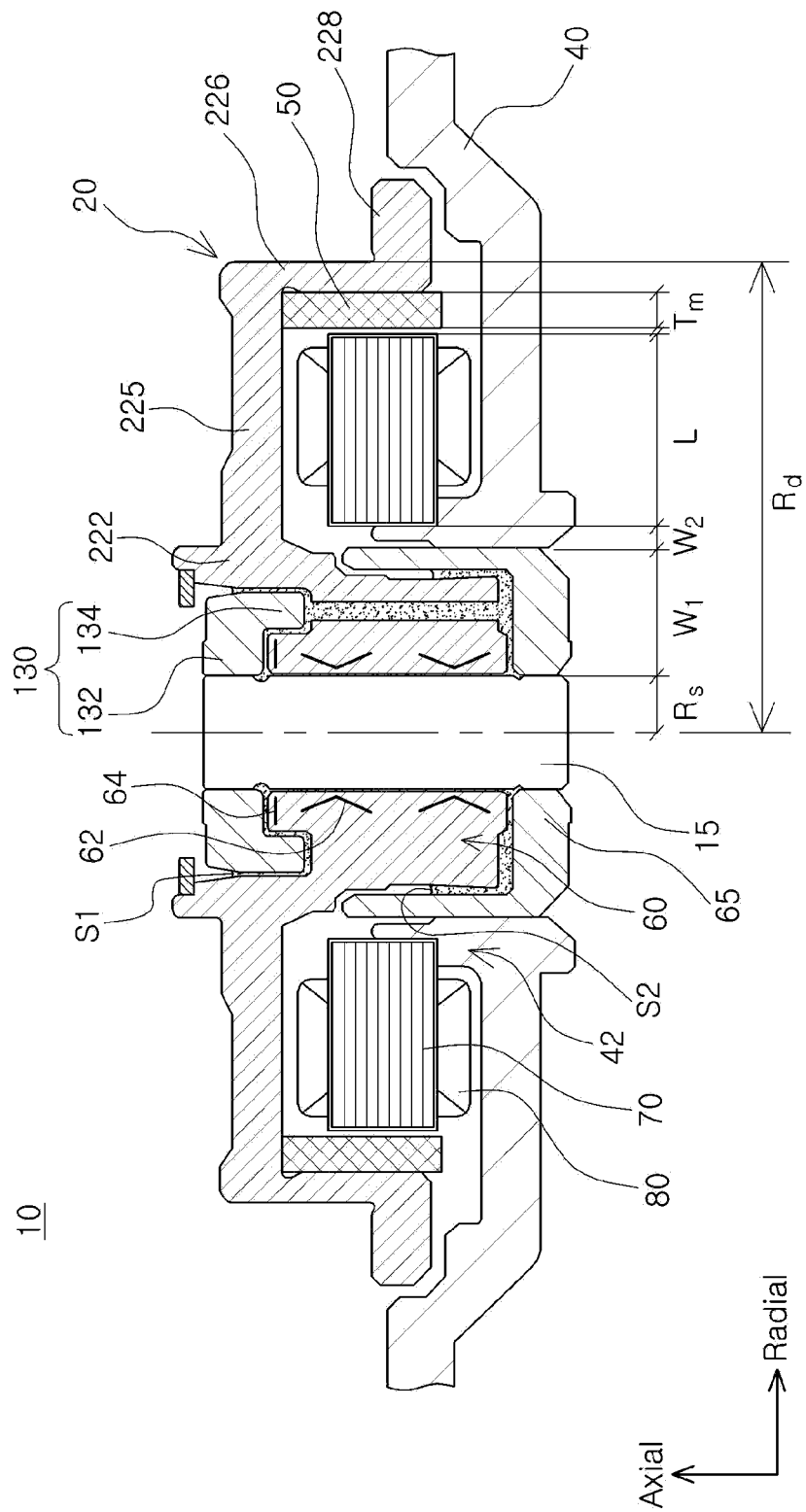
FIG. 3 is a schematic cross-sectional view showing a spindle motor according to another embodiment of the present invention.

FIG. 3 is a schematic cross-sectional view showing a spindle motor according to another embodiment of the present invention.

The spindle motor 10 according to another embodiment of the present invention shown in FIG. 3 may have a fixed shaft structure in which the shaft 15 is fixed to the base 40, a fixed member, and the sleeve 60 rotates around the shaft 15.

The spindle motor 10 according to another embodiment of the present invention shown in FIG. 3 may further include a sleeve housing 65 provided and fixed inwardly of the stator core seating part 42 in the radial direction and rotatably supporting the sleeve 60.

The shaft 15 may also be fixed through the sleeve housing 65, which is a fixed member, fixed to the base 40. The shaft 15 may be fixedly coupled to an inner end surface of the sleeve housing 65 in the radial direction.

The sleeve 60 according to the present embodiment may be a rotating sleeve and be rotatably disposed outwardly of the shaft 15 in the radial direction and inwardly of the sleeve housing 65 in the radial direction.

The rotor case 20 according to the present embodiment may be formed integrally with the rotating sleeve 60. More specifically, the rotor case 20 may be extended from the rotating sleeve 60 in the outer diameter direction and have a magnet 50 disposed on an inner peripheral surface thereof, wherein the magnet 50 faces the stator core 70 in the radial direction.

The rotor case 20 may include a rotor hub 222 connected to the rotating sleeve 60, a cover part 225 extended from the rotor hub 222 in the outer diameter direction to cover the stator core 70, and a magnet support part 226 bent from the cover part 225 downwardly in the axial direction to support the magnet 50.

In addition, the magnet support part 226 may provided with a disk support part 228 bent in the outer diameter direction to support the disk.

Here, the shaft 15 may have a fixed cap 130 press-fitted onto and fixed to an upper portion thereof. The fixed cap 130 may face an inner end portion of the rotor hub 222 in the radial direction so as to form a gap between the fixed cap 130 and the inner end portion.

The fixed cap 130 may include a body part 132 fixed to the shaft 15 and a protrusion part 134 extended from the body part 132 downwardly in the axial direction.

A gap between the protrusion part 134 and the rotor hub 222 may be filled with the oil and include a first oil sealing part S1 formed so as to seal the filled oil. That is, an outer end portion of the fixed cap 130 in the radial direction and an inner end portion of the rotor hub 222 in the radial direction may have the first oil sealing part S1 formed therebetween so as to seal the oil.

In addition, either of an outer peripheral surface of the rotating sleeve 60 and an inner peripheral surface of the sleeve housing 65 is inclined, such that a second sealing part S2 taper-sealing the oil may be formed.

In the embodiments of FIGS. 2 and 3, a length from a central portion of the shaft 15 to an outer edge of the magnet support part 226, that is, a radius Rd of the spindle motor 10 may be a fixed value. The radius Rd of the spindle motor 10 may be substantially the same as a radius of the disk, which is 10 mm.

In the miniaturized disk driving device 1 according to the embodiment of the present invention, in order to secure the B-EMF, a length L of the stator core 70 and a height H of the coil 80 wound around the stator core 70 have been adjusted in a state in which the radius Rd of the spindle motor 10 is fixed.

Prior to describing a content associated with securing the B-EMF, the stator core and the coil according to the embodiment of the present invention will be described in detail.

Figure 4:
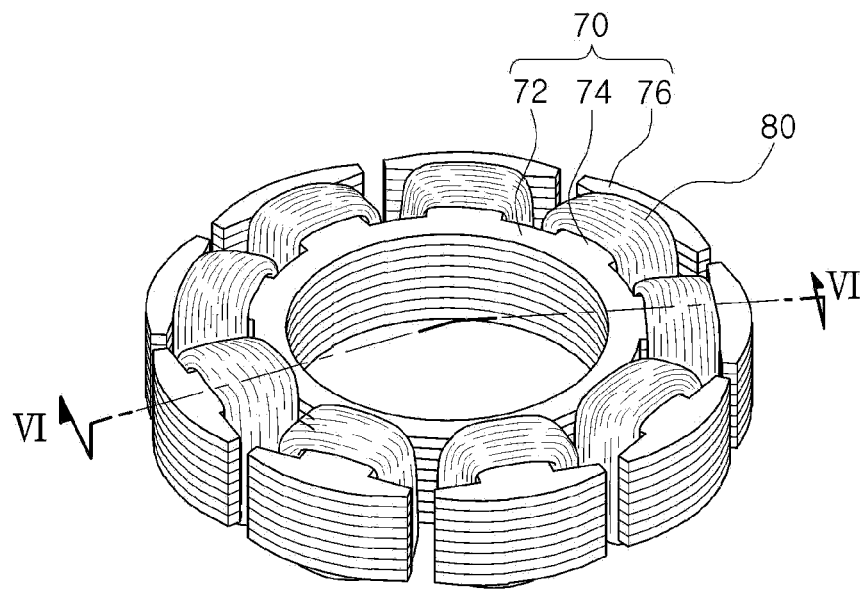
FIG. 4 is a perspective view showing a stator core according to the embodiment of the present invention and a coil wound around the stator core.
Figure 5:
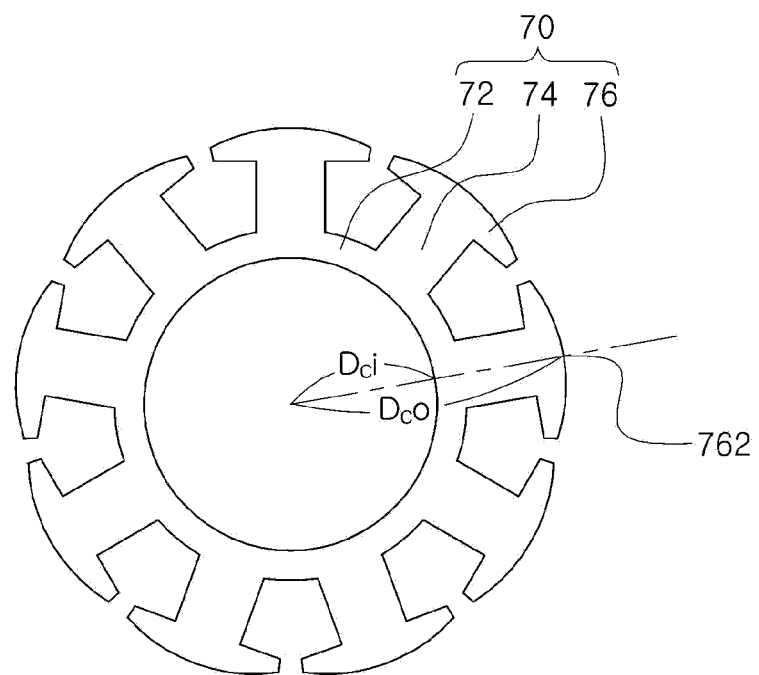
FIG. 5 is a plan view of the stator core of FIG. 4.

FIG. 4 is a perspective view showing a stator core according to the embodiment of the present invention and a coil wound around the stator core; and FIG. 5 is a plan view of the stator core of FIG. 4.

Figure 6:
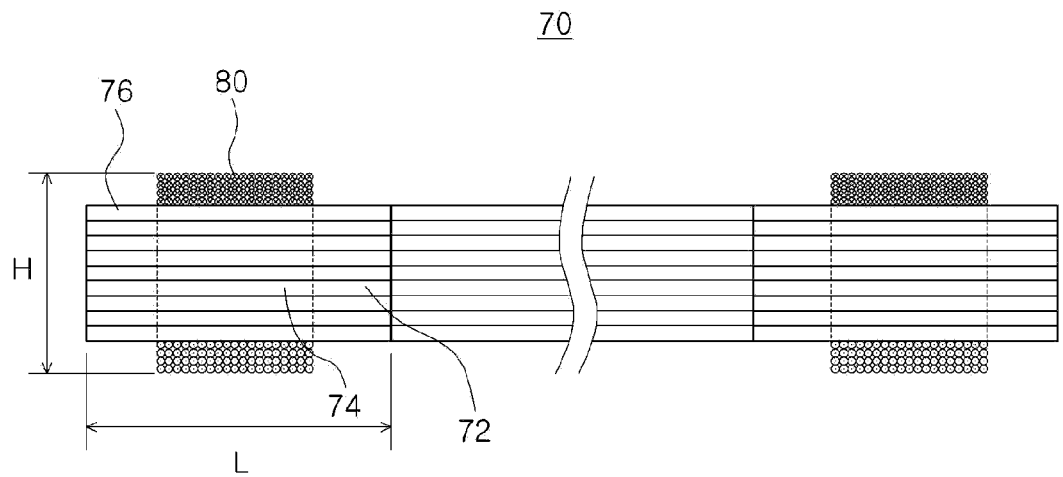
FIG. 6 is a schematic cut-away cross-sectional view taken along line VI-VI of the stator core of FIG. 4.
Figure 7:
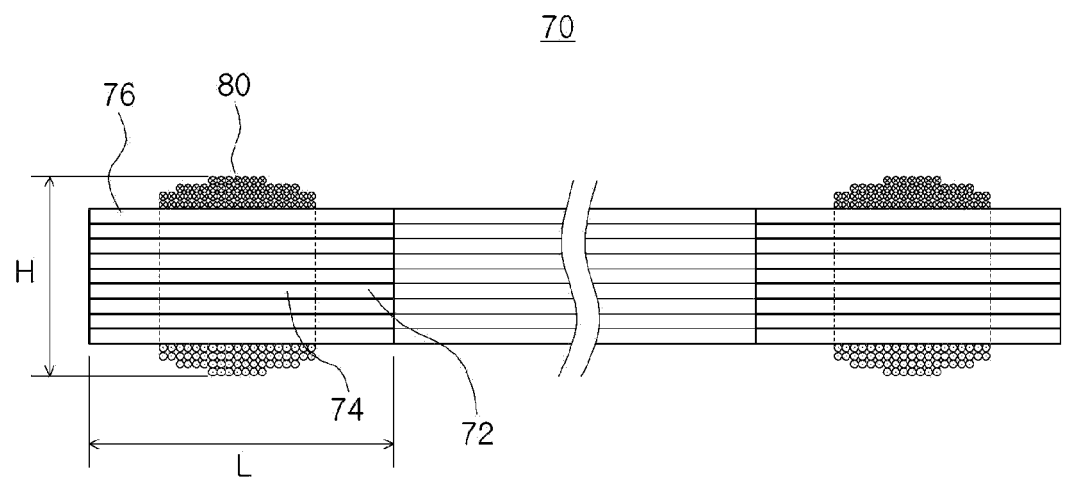
FIG. 7 is another schematic cut-away cross-sectional view taken along line VI-VI of the stator core of FIG. 4.

FIG. 6 is a schematic cut-away cross-sectional view taken along line VI-VI of the stator core of FIG. 4; and FIG. 7 is another schematic cut-away cross-sectional view taken along line VI-VI of the stator core of FIG. 4.

Referring to FIGS. 4 through 7, the stator core 70 according to the embodiment of the present invention may include a coreback part 72, a tooth part 74, and a front end part 76.

The stator core 70 may be formed by stacking a plurality of thin plate shaped silicon (Si) steels and performing press forming thereon. Alternatively, the stator core 70 may be formed by compressing powders.

The coreback part 72 may be formed in a ring shape so as to be disposed on the stator core seating part 42. The tooth part 74 may be extended from the coreback part 72 in the outer diameter direction and have the coil 80 wound therearound. In addition, the front end part 76 may be formed at an end portion of the tooth part 74 and prevent the coil 80 from going beyond the stator core 70 in the outer diameter direction.

Meanwhile, FIG. 6 shows a case in which the coil 80 is wound around the tooth part 74 at a uniform height and FIG. 7 shows a case in which the coil 80 is wound around the tooth part 74 so as to have a relatively high height at a central portion.

Here, the length of the stator core 70 from an inner end portion of the coreback part 72 to the endmost part 762 of the front end part 76 has been defined as L, and a height of the wound coil 80 from the lowermost edge of the coil 80 in the axial direction to the uppermost edge thereof has been defined as H.

The length L of the stator core 70 may also be defined as a distance obtained by dividing a distance obtained by subtracting an inner diameter Dci of the stator core contacting the base from an outer diameter Dco of the stator core 70, from the center of the stator core 70 to a point of the endmost part 762 of the stator core 70, by two, as shown in FIG. 5.

The length L of the stator core 70 may be adjusted as follows in the state in which the radius Rd of the spindle motor 10 is fixed. L may be increased by decreasing a width W2 of the stator core seating part 42 or a width W1 of the sleeve 60 in the embodiment of FIG. 2 and be increased by decreasing a width W2 of the stator core seating part 42 or a width W1 of the sleeve housing 65 in the embodiment of FIG. 3.

Again referring to FIGS. 2 and 3, it is not easy to decrease a thickness Tm of the magnet 50 since sufficient electromagnetic force needs to be generated, and it is not easy to decrease the radius Rs of the shaft since rigidity needs to be secured. Therefore, the increase in the L value for securing B-EMF may be accomplished by decreasing W1 and W2.

Meanwhile, variably adjusting the height of the wound coil 80 from the lowermost edge of the coil 80 in the axial direction to the uppermost edge thereof may include a height of the stator core 70 stacked in plural, coating layers applied to upper and lower portions of the stator core 70 in the axial direction, diameters of the coil 80 wound around the upper and lower portions of the stator core 70 in the axial direction and the number of layers of the coil 80, and coating layers applied to upper and lower portions of the coil in the axial direction.

Although wound forms of the coil 80 are different from each other in FIGS. 6 and 7, the height of the wound coil 80 from the lowermost edge of the coil 80 in the axial direction to the uppermost edge thereof may be the same value (H) as each other.

As in the embodiment of the present invention, the 2.5" type disk driving device 1 needs to secure sufficient B-EMF in order to perform the emergency parking.

The following Table 1 shows B-EMF according to a relationship among a size of a disk, a height of a driving device, a length L of a stator core, and a height H of a wound coil.

The following Table 1 shows B-EMF measured according to a difference of H/L in accordance with the trend toward miniaturization in the fixed shaft structure as in the embodiment of FIG. 3.

TABLE 1

| Experimental Example | Disk (inches) | Height of driving device (mm) | H (mm) | L (mm) | H/L | B-EMF (V/krpm) |
|---|---|---|---|---|---|---|
| 1 | 3.5" | 20 | 3.88 | 5.95 | 0.652 | 0.99 |
| 2 | 2.5" | 15 | 5.20 | 3.65 | 1.425 | 0.80 |
| 3 | 2.5" | 9.5 | 4.50 | 3.65 | 1.233 | 0.61 |
| 4 | 2.5" | 7 | 2.80 | 3.65 | 0.768 | 0.40 |
| 5 | 2.5" | 5 | 1.80 | 4.20 | 0.429 | 0.30 |
| 6 | 1.8" | 5 | 1.63 | 4.07 | 0.400 | 0.22 |

Referring to Table 1, it could be appreciated that when the disk and the disk driving device were miniaturized to form a 2.5" 5 mm thick type disk driving device, B-EMF is decreased to 0.35V/krpm or less.

In Experimental Examples 5 and 6 corresponding to the case in which B-EMF was decreased to 0.35V/krpm or less, it was difficult to implement the emergency parking of the recording head. That is, in the case in which the disk and the disk driving device were miniaturized to form the 2.5" 5 mm thick type disk driving device, it was appreciated that the B-EMF was changed according to a ratio of the height of the wound coil to the length of the stator core, that is, H/L.

Therefore, it could be appreciated that the length L of the stator core 70 and the height H of the wound coil 80 from the lowermost edge of the coil 80 in the axial direction to the uppermost edge thereof need to be optimized while being adjusted.

Hereinafter, in the case in which the disk and the disk driving device are miniaturized to form the 2.5" 5 mm thick type disk driving device, the embodiment of the present invention will be described with reference to Table 2 showing experimental results obtained by measuring B-EMF in the case in which H/L is changed.

Table 2 shows B-EMF values measured while adjusting the length L of the stator core 70 and the height H of the wound coil 80 from the lowermost edge of the coil 80 in the axial direction to the uppermost edge thereof in the spindle motor applied to the 2.5" 5 mm thick type disk driving device.

Here, a unit of B-EMF may be V/krpm, and B-EMF needs to be 0.35 V/krpm or more in order to stably implement emergency parking.

TABLE 2

| | | H | | | | | | |
|---|---|---|---|---|---|---|---|---|
| | | 2.1 | 2.2 | 2.3 | 2.4 | 2.5 | 2.6 | 2.7 |
| L | 3.6 | *0.306 | *0.321 | *0.326 | *0.331 | *0.342 | *0.347 | *0.362 |
| | 3.7 | *0.328 | 0.353 | 0.358 | 0.362 | 0.374 | 0.379 | *0.394 |
| | 3.8 | *0.334 | 0.357 | 0.362 | 0.366 | 0.380 | 0.385 | *0.398 |
| | 3.9 | *0.337 | 0.363 | 0.368 | 0.371 | 0.385 | 0.390 | *0.406 |
| | 4.0 | *0.342 | 0.369 | 0.374 | 0.375 | 0.389 | 0.396 | *0.412 |
| | 4.1 | *0.345 | 0.372 | 0.377 | 0.382 | 0.393 | 0.398 | *0.413 |
| | 4.2 | *0.349 | 0.378 | 0.381 | 0.386 | 0.399 | 0.404 | *0.417 |
| | 4.3 | *0.369 | *0.394 | *0.399 | *0.405 | *0.415 | *0.420 | *0.435 |

*Comparative Example

Referring to Table 2, in the case in which the disk and the disk driving device are the 2.5" 5 mm thick type disk driving device, when H/L satisfies a range of 0.524H/L0.703, stable B-EMF may be secured.

Table 2 shows B-EMF (unit: V/krpm) changed according to a change in H and L values (unit: mm). Here, the case in which B-EMF was less than 0.35 V/krpm may be considered to be a Comparative Example and the case in which B-EMF was 0.35 V/krpm or more may be considered to be an Inventive Example.

Portions having a mark * indicate a Comparative Example, and H/L of Inventive Example not having a mark * satisfies a range of $0.524 \leq H/L \leq 0.703$.

More specifically, in the case in which H was 2.2 and L was 4.2, H/L is 0.524 and B-EMF is 0.378 V/krpm, and in the case in which H was 2.6 and L was 3.7, H/L is 0.703 and B-EMF is 0.379 V/krpm.

In the Comparative Example corresponding to the case in which H/L was less than 0.524, in the case in which H is 2.1 and L was 4.1 or 4.2 (in this case, H/L is 0.512 or 0.500), since B-EMF fell to less than 0.350 V/krpm, emergency parking could not be performed.

Meanwhile, in the Comparative Example in which B-EMF was 0.350 V/krpm or more even in the case in which H/L was less than 0.524, in the case in which H was 2.1 and L was 4.3 or H was 2.2 and L was 4.3 (in this case, H/L is 0.488 or 0.512), sufficient B-EMF may be secured. However, a natural vibration frequency to be described below may be insufficient (hereinafter, see Table 3) and thrust dynamic pressure may be insufficient (hereinafter, See Table 4).

The case in which H/L is relatively low corresponds to the case in which the height H of the wound coil from the lowermost edge of the coil in the axial direction to the uppermost edge thereof is relatively low, and the case in which the height of the stator core is relatively low or the height of the coil is relatively low.

That is, the low height of the stator core indicates that the number of stacked cores is small. In this case, since magnetic saturation is increased, iron loss is increased, such that B-EMF may be low.

In addition, the case in which the height of the coil is low may be divided into the case in which turns of the coil are low and the case in which a diameter of the coil itself is low. In the case in which the turns of the coil are low, it is difficult to secure sufficient electrical force flowing in the coil, and in the case in the diameter of the coil itself is small, since resistance in the coil is relatively large, it may be impossible to obtain sufficient B-EMF.

In the case in which H is low, L is increased, whereby the B-EMF may be supplemented. However, when L is excessively increased, the natural vibration frequency insufficiency problem and the thrust dynamic pressure insufficiency problem may be generated.

The case in which H/L exceeds 0.703 corresponds to the case in which H is high and L is low. In the case in which H is high, the height of the core is high or the number of winding layers of the coil is large, such that it is advantageous for securing the B-EMF. However, a height of the disk driving device is limited to 5 mm and may not be increased.

Therefore, when the height of the disk driving device is limited to 5 mm, it is actually impossible to realize a H of 2.7 or more.

More specifically, in the case in which H is 2.7 and L is 3.6, 3.7, or 3.8 (H/L is 0.750, 0.730, or 0.711), which corresponds to the case in which H/L exceeds 0.703, the B-EMF is secured. However, this case is not appropriate for the 5 mm disk driving device.

Meanwhile, in the case in which L is 3.6 corresponding to a small value, since the length of the stator core having the coil wound therearound is relatively short, the turns of the coil are reduced, such that it is difficult to secure B-EMF. In Comparative Example in which L is 3.6 and H is 2.1, 2.2, 2.4, 2.5, and 2.6, B-EMF is 0.350 V/krpm or less, such that it is difficult to perform the emergency parking.

Hereinafter, Experimental Examples according to the embodiment of the present invention in which a magnitude of L was changed will be described.

In the spindle motor according to the embodiment of the present invention, in the case in which the disk and the disk driving device are the 2.5" 5 mm thick type disk driving device, H may satisfy a range of 2.20 mm to 2.60 mm, and L may have a range of 3.70 mm to 4.20 mm.

When the radius Rd of the inner side of the disk is a fixed value, as described above, L may be increased by decreasing a width W2 of the stator core seating part 42 and a width W1 of the sleeve 60 in the embodiment of FIG. 2 and be increased by decreasing a width W2 of the stator core seating part 42 and a width W1 of the sleeve housing 65 in the embodiment of FIG. 3.

Based on the embodiment of FIG. 3, Experimental Example in which an experiment was performed by decreasing the width W2 of the stator core seating part 42 in a state in which the width W1 of the sleeve housing 65 is fixed will be described with reference to the following Table 3, and Experimental Example in which an experiment was performed by decreasing the width W1 of the sleeve housing 65 in a state in which the width W2 of the stator core seating part 42 is fixed will be described with reference to the following Table 4.

TABLE 3

| | | | H | | | | | | |
|---|---|---|---|---|---|---|---|---|---|
| L | W1 | W2 | 2.1 | 2.2 | 2.3 | 2.4 | 2.5 | 2.6 | 2.7 |
| 3.6 | 1.95 | 1.44 | *851 | *851 | *851 | *851 | *851 | *851 | *851 |
| 3.7 | 1.95 | 1.34 | *845 | 845 | 845 | 845 | 845 | 845 | *845 |
| 3.8 | 1.95 | 1.24 | *836 | 836 | 836 | 836 | 836 | 836 | *836 |
| 3.9 | 1.95 | 1.14 | *824 | 824 | 824 | 824 | 824 | 824 | *824 |
| 4.0 | 1.95 | 1.04 | *806 | 806 | 806 | 806 | 806 | 806 | *806 |
| 4.1 | 1.95 | 0.94 | *781 | 781 | 781 | 781 | 781 | 781 | *781 |
| 4.2 | 1.95 | 0.84 | *745 | 745 | 745 | 745 | 745 | 745 | *745 |
| 4.3 | 1.95 | 0.74 | *652 | *652 | *652 | *652 | *652 | *652 | *652 |

*Comparative Example

Referring to Table 3, in the case in which the disk and the disk driving device are the 2.5" 5 mm thick type disk driving device, a natural vibration frequency (unit: Hz) applied to the base 40 of the disk driving device 1 has been measured under a condition in which L is increased while W2 is decreased in a state in which W1 is fixed to 1.95 and H is fixed to 2.1, 2.2, 2.3, 2.4, 2.5, 2.6, and 2.7 mm. Here, a unit of each of W1 and W2 is mm.

In the case in which the natural vibration frequency applied to the base is less than 700 Hz, vibration may be generated and noise may be increased due to the vibration.

In all of the Experiment Examples in which L had a range of 3.6 to 4.20 mm while W2 was decreased in a state in which H is fixed to 2.1, 2.2, 2.3, 2.4, 2.5, 2.6, and 2.7 mm, the natural vibration frequency becomes 700 Hz or more and the base is stably maintained. Since the natural vibration frequency of the base was measured, the natural vibration frequency was irrelevant to a dimension, that is, an H value, for the heights of the stator core and the coil.

In Comparative Examples in which L is 4.3, the natural vibration frequency had a value less than 700 Hz regardless of the H value and the vibration and the noise are generated.

Meanwhile, in Comparative Examples in which L is 3.60, the natural vibration frequency was stable; however, a space in which the coil is wound is insufficient, such that the turns of the coil are decreased, thereby decreasing B-EMF (See Table 2). In addition, in Comparative Examples in which H is 2.1, B-EMF was reduced, and in Comparative Examples in which H is 2.7, the height of the disk driving device is limited (See Table 2).

That is, it can be appreciated that the width W2 of the stator core seating part 42 needs to be at least 0.84 mm or more in order to secure the stable natural vibration frequency. The following Table 4 shows a result obtained by testing whether the thrust dynamic pressure may be sufficiently secured by changing the width W1 of the sleeve housing 65 in a state in which W2 is minimally fixed.

TABLE 4

| | | | H | | | | | | |
|---|---|---|---|---|---|---|---|---|---|
| L | W1 | W2 | 2.1 | 2.2 | 2.3 | 2.4 | 2.5 | 2.6 | 2.7 |
| 3.6 | 2.55 | 0.84 | *5.358 | *5.358 | *5.358 | *5.358 | *5.358 | *5.358 | *5.358 |
| 3.7 | 2.45 | 0.84 | *4.337 | 4.337 | 4.337 | 4.337 | 4.337 | 4.337 | *4.337 |
| 3.8 | 2.35 | 0.84 | *3.431 | 3.431 | 3.431 | 3.431 | 3.431 | 3.431 | *3.431 |

TABLE 4-continued

| | | | \multicolumn{7}{c}{H} |
| L | W1 | W2 | 2.1 | 2.2 | 2.3 | 2.4 | 2.5 | 2.6 | 2.7 |
|---|---|---|---|---|---|---|---|---|---|
| 3.9 | 2.25 | 0.84 | *2.642 | 2.642 | 2.642 | 2.642 | 2.642 | 2.642 | *2.642 |
| 4.0 | 2.15 | 0.84 | *1.971 | 1.971 | 1.971 | 1.971 | 1.971 | 1.971 | *1.971 |
| 4.1 | 2.05 | 0.84 | *1.404 | 1.404 | 1.404 | 1.404 | 1.404 | 1.404 | *1.404 |
| 4.2 | 1.95 | 0.84 | *0.977 | 0.977 | 0.977 | 0.977 | 0.977 | 0.977 | *0.977 |
| 4.3 | 1.85 | 0.84 | *0.642 | *0.642 | *0.642 | *0.642 | *0.642 | *0.642 | *0.642 |

*Comparative Example

Referring to Table 4, in the case in which the disk and the disk driving device are the 2.5" 5 mm thick type disk driving device, whether the rotating sleeve is floated in the sleeve housing has been measured under a condition in which L is increased while W1 is decreased in a state in which W2 is fixed to 0.84 and H is fixed to 2.1, 2.2, 2.3, 2.4, 2.5, 2.6, and 2.7 mm. Here, a unit of each of W1 and W2 may be mm. In addition, a stable floating condition is as follows. When the rotating sleeve is floated by 3 μm, force applied to a thrust dynamic pressure groove formed in the sleeve needs to be 0.9 N or more. Table 4 shows a measurement result of measuring force applied to the thrust dynamic pressure groove formed in the sleeve when the rotating sleeve is floated by 3 μm in a stable floating condition. Here, a unit of the force is N.

In all of Experiment Examples in which L has a range of 3.6 to 4.20 mm while W1 is decreased in a state in which H is fixed to 2.1, 2.2, 2.3, 2.4, 2.5, 2.6, and 2.7 mm, floating force capable of floating the rotating sleeve may be 0.9 N or more.

Meanwhile, in Comparative Examples in which L is 3.60, the rotating sleeve has floating force at which it may be floated; however, a space in which the coil is wound is insufficient, such that the turns of the coil are decreased, thereby decreasing B-EMF (See Table 2). In addition, in Comparative Examples in which H is 2.1, B-EMF is reduced, and in Comparative Examples in which H is 2.7, the height of the disk driving device is limited (See Table 2).

As set forth above, with the spindle motor and the disk driving device according to the embodiments of the present invention, B-EMF is sufficiently secured in the miniaturized 2.5" type disk driving device, whereby the emergency parking may be stably performed.

In addition, generation of the vibrations or the noise may be suppressed while securing B-EMF allowing the emergency parking to be stably performed.

Further, loss of the thrust dynamic pressure may be reduced, and floating force of the miniaturized spindle motor may be sufficiently secured.

While the present invention has been shown and described in connection with the embodiments, it will be apparent to those skilled in the art that modifications and variations can be made without departing from the spirit and scope of the invention as defined by the appended claims.

What is claimed is:

1. A spindle motor for a 2.5" type disk driving device, comprising:
    a base having a stator core seating part protruding upwardly in an axial direction;
    a stator core including a ring-shaped coreback part disposed on the stator core seating part, a tooth part extended from the coreback part in an outer diameter direction, and a front end part formed at an end portion of the tooth part; and
    a coil wound around the stator core,
    wherein a length of the stator core from an inner end portion of the coreback part to the endmost part of the front end part is defined as L and a height of the wound coil from the lowermost edge of the coil in an axial direction to the uppermost edge thereof is defined as H, a ratio (H/L) of the height of the wound coil to the length of the stator core in which back electromotive force (B-EMF) is 0.35 V/Krpm or more when the supply of power is stopped, satisfying $0.524 \leq H/L \leq 0.703$.

2. The spindle motor of claim 1, wherein the disk driving device has a height of 5 mm.

3. The spindle motor of claim 2, wherein L has a range of 3.70 to 4.20 mm, and H has a range of 2.20 to 2.60 mm.

4. The spindle motor of claim 1, further comprising:
    a sleeve provided inwardly of the stator core seating part in a radial direction; and
    a shaft rotatably disposed in the sleeve.

5. The spindle motor of claim 4, further comprising a rotor case fixed to the shaft and having a magnet disposed on an inner peripheral surface thereof, the magnet facing the stator core in the radial direction,
    wherein the rotor case includes a main wall part protruding downwardly in an axial direction so that the oil is sealed between an outer peripheral surface of the sleeve and an inner peripheral surface of the main wall part, the main wall part facing an inner peripheral surface of the stator core seating part in the radial direction.

6. The spindle motor of claim 1, further comprising:
    a sleeve housing provided inwardly of the stator core seating part in the radial direction;
    a shaft fixedly coupled to an inner end surface of the sleeve housing in the radial direction; and
    a rotating sleeve rotatably disposed outwardly of the shaft in the radial direction and inwardly of the sleeve housing in the radial direction.

7. The spindle motor of claim 6, further comprising:
    a rotor case extended from the rotating sleeve in an outer diameter direction and having a magnet disposed on an inner peripheral surface thereof, the magnet facing the stator core in the radial direction; and
    a fixed cap fixed to an upper portion of the shaft and facing an inner end portion of the rotor case in the radial direction so as to form a gap between the fixed cap and the inner end portion,
    wherein an outer edge of the fixed cap in the radial direction and an inner end portion of a rotor hub in the radial direction include a first oil sealing part formed therebetween so as to seal oil, and
    either of the outer peripheral surface of the rotating sleeve and an inner peripheral surface of the sleeve housing is inclined, such that a second oil sealing part taper-sealing the oil is formed.

8. A disk driving device comprising:
the spindle motor of claim 1;
a head transfer part transferring a recording head reading information stored on a disk mounted in the spindle motor and writing data to the disk; and
a housing receiving the spindle motor and the head transfer part therein.

9. The disk driving device of claim 8, wherein the number of disks is 2 or less.

10. A spindle motor for a 2.5" type 5 mm thick disk driving device, comprising:
a stator core; and
a coil wound around the stator core,
wherein a distance obtained by subtracting an inner diameter of the stator core contacting a base from an outer diameter of the stator core, from the center of the stator core to a point of the endmost part of the stator core, is defined as L and a height of the wound coil from the lowermost edge of the coil in an axial direction to the uppermost edge thereof is defined as H, H/L satisfying $0.524 \leq H/L \leq 0.703$.

* * * * *